Oct. 16, 1962     K. W. MASTERS ET AL     3,059,121
REGULATED POWER SUPPLY ARRANGEMENTS
Filed April 20, 1959     3 Sheets-Sheet 1

INVENTORS
KENNETH WILLIAM MASTERS
MALCOLM IVOR GEORGE GRANT
HUGH STANLEY DOUBLE

BY Larson and Taylor

INVENTORS
KENNETH WILLIAM MASTERS
MALCOLM IVOR GEORGE GRANT
HUGH STANLEY DOUBLE

BY

INVENTORS
KENNETH WILLIAM MASTERS
MALCOLM IVOR GEORGE GRANT
HUGH STANLEY DOUBLE

United States Patent Office 3,059,121
Patented Oct. 16, 1962

3,059,121
REGULATED POWER SUPPLY ARRANGEMENTS
Kenneth William Masters, Swanley, Kent, Malcolm Ivor George Grant, Blackheath, London, and Hugh Stanley Doubie, Eltham, London, England, assignors to Associated Electrical Industries (Woolwich) Limited, a British company
Filed Apr. 20, 1959, Ser. No. 807,634
Claims priority, application Great Britain Apr. 23, 1958
4 Claims. (Cl. 307—54)

This invention relates to regulated power supply arrangements for supplying end-fed operating power, especially direct current power, to apparatus such as repeaters spaced along a telecommunications cable link.

In telecommunication submarine cable links having repeaters at spaced intervals, direct current power for operating the thermionic valves or other active elements of the repeaters may be fed along the cable from terminal sources supplying substantially constant current, the repeaters being connected in tandem as regards this power supply. In one particular arrangement which has previously been proposed a supply unit is provided for each end of the cable: the unit at one end is arranged normally to supply constant current, while that at the other end is arranged to supply, in dependence on the cable voltage, an amount of current which converges towards that supplied by the other unit, being substantially equal thereto around the normal working voltage. The functions of the two units are interchangeable and each unit is capable, when controlled to provide constant current, of maintaining the current flow at full voltage should the other unit fail, some form of switching means responsive to cable voltage being effective on failure of one unit to cause the other unit to fulfill the constant current function and supply all the power.

It is an object of the invention to provide a simplified arrangement which eliminates the need for switching in the units but still permits normal double-ended, constant current supply to be replaced by single-ended supply on failure of either unit.

In describing the invention reference will be made to the accompanying drawings in which:

FIG. 1 schematically illustrates in block form a power supply arrangement for supplying end-fed power to apparatus spaced along a telecommunications cable link;

FIG. 3 shows the circuit of a preferred power supply unit having a characteristic approximating to that of FIG. 2;

Figure 1:
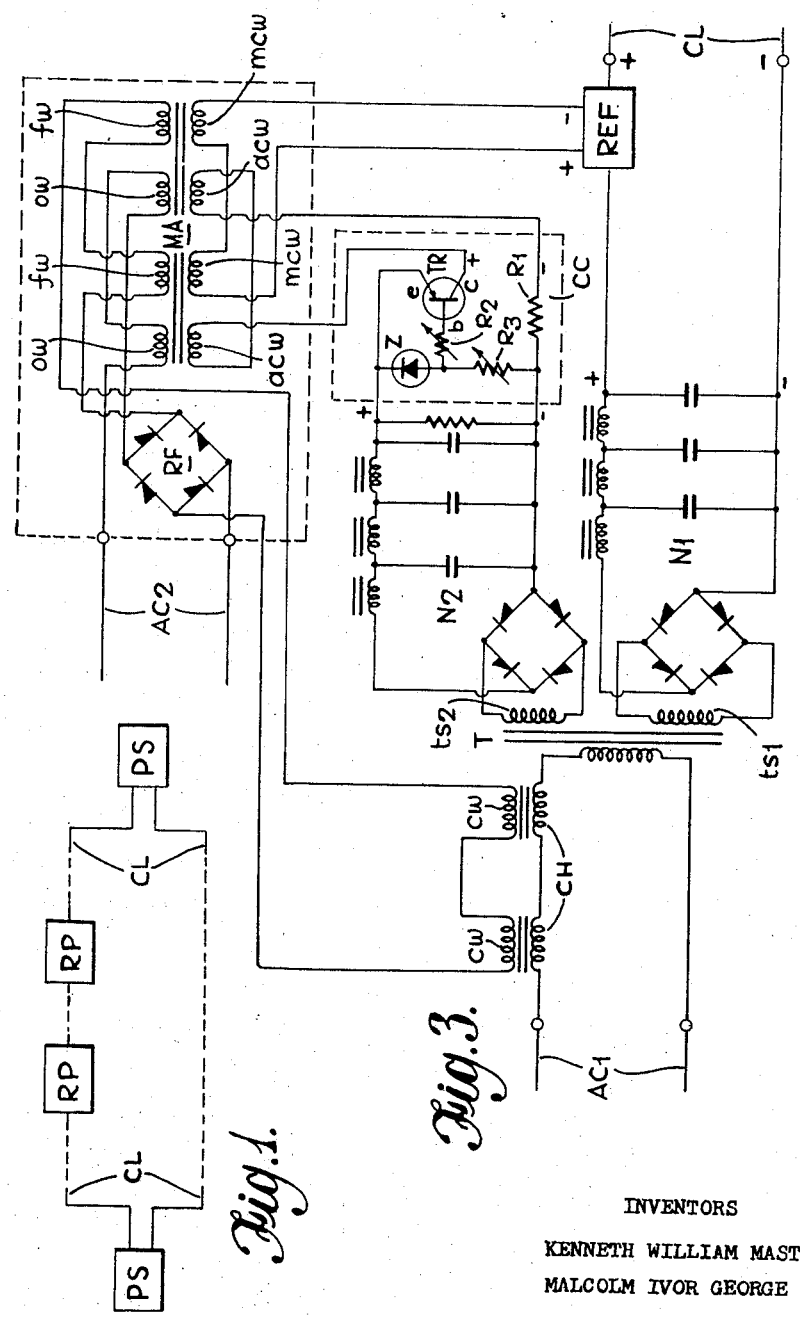

Referring to FIG. 1, a telecommunications cable link represented by CL and requiring operating electric power for apparatus such as repeaters RP located between its ends, is provided at its opposite ends with power supply units PS both of which normally share in supplying the requisite power but either one of which, on failure of the other, can function by itself to supply the necessary power.

According to the invention the power supply units such as PS are designated with characteristics such that the magnitudes of the output currents of the two units are convergent, with rising output voltage, towards a particular current level at which the output voltage of each unit is regulated to be approximately half the total voltage (normally provided by the effective series connection of the two units) required to maintain that current level in the cable link, each unit being able by itself to maintain said current level at output voltages up to at least a value equal to said total voltage. Consequently either unit can maintain said current level at full voltage in the absence of supply from the other unit, without requiring any switching action to change over from double-ended to single-ended operation.

Figure 2:
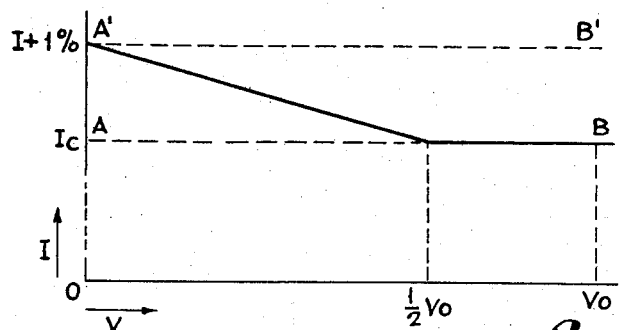
FIG. 2 illustrates an idealised output characteristic to which, in accordance with the invention, the outputs of power supply units at opposite ends of the link are designed to approximate.

To this end it is contemplated to use supply units each of which includes a voltage responsive control circuit by which its output current is controlled to fall from an initial relatively high value to the particular level mentioned as the controlling voltage rises to approximately half the total required working voltage, and thereafter to remain substantially constant up to a value of controlling voltage at least equal to the total working voltage, and a current responsive circuit by which the current supplied by the unit is reduced if the cable current tends to rise, as would happen if, with one unit initially supplying the power by itself, the other unit then became effective to share the load. A suitable output characteristic for the units is represented in idealised form in FIG. 2 which gives a graph of output current I against output voltage V and from which it will be noted that the current falls linearly from a value 1% above the working level $I_c$ at zero voltage to the working level $I_c$ at half full voltage $V_0$ and thereafter remains substantially constant at the working level $I_c$ at least up to full voltage V.

More specifically, the supply units at each end of the cable link may have a circuit such as that shown in FIG. 3. Referring to FIG. 3, power is fed into the end of the cable link CL from a reliable alternating current source A.C. by way of a transformer T and a rectifying and smoothing network N1 fed from a secondary winding $ts1$ of the transformer T. A saturable regulating choke CH is connected in series with the primary winding $tp$ of the transformer T and this choke CH has a D.C. control winding $cw$ which is fed from a rectifier bridge RF in the output circuit of a magnetic amplifier MA. The output winding $ow$ of the magnetic amplifier MA is supplied with alternating voltage from a suitable source AC2, and in addition to this winding the magnetic amplifier has also a main control winding $mcw$, an auxiliary control winding $acw$ and a positive feedback winding $fw$. These windings of the magnetic amplifier, and likewise the windings of the choke CH, are each shown as being constituted by two separate winding sections as is common practice.

Figure 4:
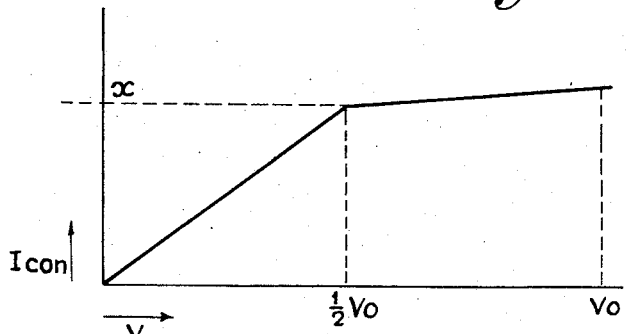
FIG. 4 illustrates the idealised characteristic required from an auxiliary control circuit included in the circuit of FIG. 3.

The main control winding $mcw$ of the magnetic amplifier MA effects its control in accordance with the current in the cable CL. To this end it is fed from the output of a reference circuit REF which is connected in series with the cable load and feeds to the control winding $mcw$ a control current proportional to deviation of the cable current from a given level. Suitable forms of reference circuit will be mentioned later. The auxiliary control winding $acw$ of the magnetic amplifier MA effects its control in accordance with the voltage applied to the cable CL by the power unit: to this end it is fed with current from an auxiliary control circuit CC to which is applied, from an auxiliary secondary winding $ts2$ on the transformer T via a rectifying and smoothing network N2, an input voltage proportional to the applied cable voltage. The feedback winding $fw$ of the magnetic amplifier MA is opposed in its magnetic effect by the combined action of the main and auxiliary windings $mcw$ and $acw$. The magnetic amplifier MA, acting through the regulating choke CH, is arranged to control the level of the current fed to the cable CL in such manner that with the main control winding *mcw* acting in the absence of any control by the auxiliary winding *acw* the current level would be somewhat higher (for example 1% higher) than the required level of cable current, but that under the joint control of the main and auxiliary control windings *mcw* and *acw* the current level is constrained to fall to the required value as the cable voltage rises from zero to approximately half the total required working voltage (see FIG. 2), and thereafter to remain substantially constant up to at least a voltage corresponding to the total cable voltage. To obtain this result the auxiliary control circuit is designed to produce in the auxiliary control winding *acw* of the magnetic amplifier MA a current $I_{con}$ (FIG. 4) which rises with increasing voltage V applied to the cable by transformer T until that voltage reaches approximately half the total required working voltage $V_0$, whereafter for further increase of the voltage, the current $I_{con}$ supplied to the auxiliary control winding remains relatively constant.

As shown in FIG. 3 an auxiliary circuit giving this characteristic comprises a power transistor TR of the PNP type having its emitter *e* directly connected to the positive side of the output voltage from the network N2, its collector *c* connected to the negative side through a limiting resistor R1 and the auxiliary control winding *acw* of the magnetic amplifier MA, and its base *b* connected through an adjusting resistor R2 to the junction between a Zener diode Z and a further resistor R3 connected in series across the output voltage of network N2 with the diode Z connected to and poled towards the positive side. As the voltage from network N2 rises, correspondingly with rise of the voltage applied to the cable CL from network N1, the base-emitter negative current bias of the transistor T and thus the emitter-collector current flowing through the auxiliary winding *acw* of the magnetic amplifier MA, initially rises at a rate modified by the effective feedback which takes place through the magnetic amplifier MA and regulating choke CH. This rise continues until the voltage reaches a value at which the reverse impedance of the Zener diode Z collapses and there is established across the latter, in characteristic manner, a substantially constant potential difference. The circuit constants in the auxiliary control circuit CC are so chosen that this occurs when the applied collector-emitter voltage reaches a value corresponding to approximately half the required cable voltage.

Figure 5:
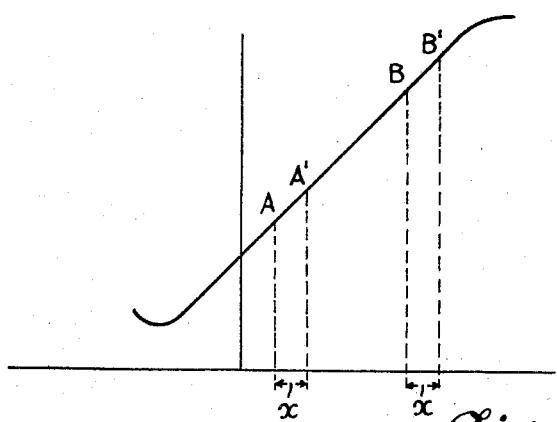
FIG. 5 illustrates a typical output characteristic for a magnetic amplifier.

In further explaining the operational requirements of auxiliary control circuit CC in relation to the magnetic amplifier MA, reference will additionally be made to FIG. 5, showing a typical characteristic relating the output current of the magnetic amplifier to the controlling ampere-turns: in the present instance, the output current if, of course, the current controlling the saturation of the regulating choke CH, and the controlling ampere-turns are those provided by the main and auxiliary control windings *mcw* and *acw* in conjunction with the feedback winding *fw*.

As has already been indicated, the reference circuit REF is set so that, in the absence of control by the auxiliary control winding *acw* of the magnetic amplifier MA the current fed to the cable is $I_c+1\%$ where $I_c$ is the desired current level for normal working. For this current $I_c+1\%$ to be fed to the cable the output current from the magnetic amplifier to the regulating choke CH must lie between A' and B' in FIG. 5, corresponding to the current level A'—B' in FIG. 2. A' is the required value at short circuit (zero voltage) and B' the value at maximum voltage. For the desired current $I_c$ to be delivered to the cable, the magnetic amplifier output must vary over the range A—B in FIG. 5, corresponding to the current level A—B in FIG. 2. Hence at the normal working point the auxiliary control winding *acw* must supply *x* ampere-turns (FIGS. 5 and 4) to the amplifier in opposition to those from the main control winding *mcw*, the required output characteristic (FIG. 2) being obtained by causing these opposing ampere-turns to vary linearly, under control of the auxiliary control circuit, from zero at no volts to *x* at half-voltage and thence to remain relatively constant as already explained with reference to FIG. 4.

In the operation of the overall arrangement, a supply unit conforming to FIG. 3 being provided at each end of the cable link, the first unit to be switched on will act as a constant current generator and will supply the required current at the full cable voltage. When the second unit is switched on it tends to produce a current somewhat higher than the required value since at the moment of switching on the auxiliary control winding in this second unit is ineffective and the feedback winding is opposed only by the main control winding. This relatively high current provides an over excitation of the main control winding in the first supply unit, causing a reduction of the voltage which this latter unit applies to the cable. The second supply unit then responds to the new current and voltage conditions in the cable by increasing the voltage which the unit applies to the cable and at the same time reducing the current it supplies. The action is a progressive one which continues at both units until they reach a stable condition in which each provides half the total voltage at the required current level.

It is contemplated that in practice additional, similar supply units would be provided at the opposite ends of the cable link for stand-by purposes and that automatic switching would be provided for effecting transfer of the supply function to the stand-by unit in the event of failure of the working unit. During the change-over period the full cable load would be supplied by the unit at the far end operating alone and no disruption of the power feed would therefore result. Manual switching may also be provided for transferring from a working unit to a stand-by unit.

Figure 6:
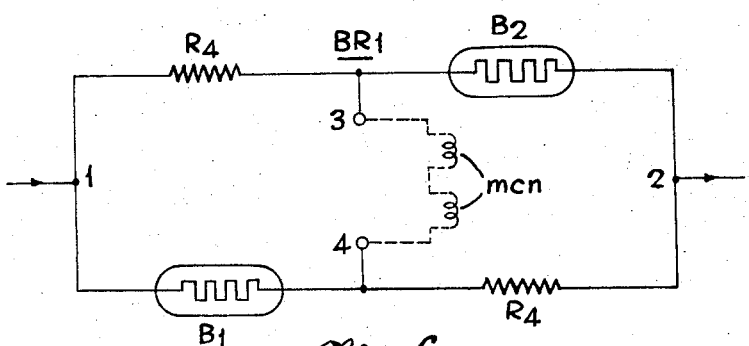
FIGS. 6 and 7 show two possible circuits for a reference circuit included in the circuit of FIG. 3.

The reference circuit REF included in the circuit of FIG. 3 may take any suitable form capable of fulfilling the required function, namely of producing a sufficiently large output current substantially proportional to and of sense dependent on the sense of deviation of the cable current from a given level. For example a barretter bridge such as that of FIG. 6, or a transistor bridge such as that of FIG. 7, may be employed. The barretter bridge of FIG. 6 comprises a four-arm balanceable bridge BR1 having linear resistors R4, R5 included in one pair of opposite arms, and barretters B1, B2, the resistance of which increases with current flow through them, included in the remaining pair of arms. This bridge BR would be connected in series with the cable link at diagonally opposite corners 1 and 2, and the output to the main control winding *mcw* of the magnetic amplifier MA would be taken from the other corners 3 and 4 of the bridge. The bridge BR is designed or adjusted to be balanced for a cable current of the required level $(I_c+1\%)$ and any deviation from this value results in a corresponding change in the output from the bridge, owing to the consequent change of resistance of the barretters B1 and B2 and the resultant change of voltage distribution in the bridge.

Figure 7:
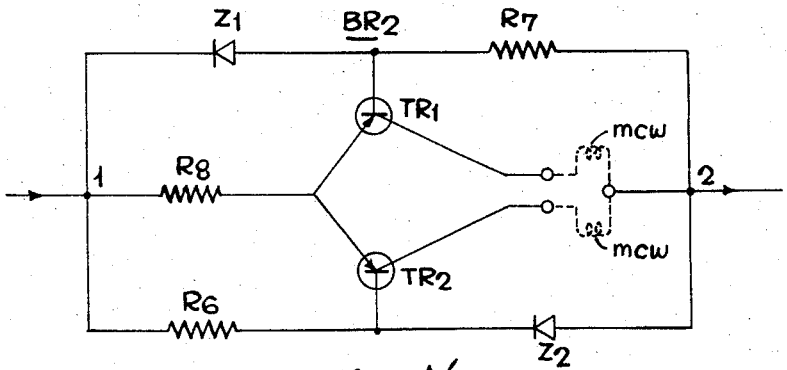

The transistor bridge reference circuit of FIG. 7 comprises a four-arm bridge BR2, which includes linear resistors R6 and R7 in one pair of opposite arms and Zener diodes Z1 and Z2 in the other pair of arms. The emitter-base diodes of transistors TR1 and TR2 are connected across the diodes Z1 and Z2 in series with a common emitter resistor R8. The two sections of the main control winding *mcw* of the magnetic amplifier would be in this instance be respectively connected in the emitter-collector circuits of the two transistors as indicated and the bridge as a whole would be connected into the cable link at its corners 1 and 2. At the level of cable current at which the bridge BR2 is balanced $(I_c+1\%)$, the voltage distribution in the bridge is such that the collector currents of the transistors TR1 and TR2 are equal and since these currents are applied differentially to the two sections of the magnetic amplifier main control winding mcw the effective output from the bridge is zero in this condition. When the cable current diverges from the level for bridge balance, a re-distribution of voltage occurs due to the presence of the Zener diodes Z1 and Z2 and results in the collector current of one transistor rising while that in the other falls, depending on the sense of the divergence. This in turn produces a corresponding control action on the magnetic amplifier.

Another possible form of reference circuit which may be mentioned is one employing a so-called magnetic discriminator, known in itself.

What we claim is:

1. A regulated power supply arrangement which includes, for opposite ends of a telecommunications cable link having electrical apparatus located between its ends, respective power supply units cooperable to normally provide a joint supply of power to said apparatus at a required current level and each having an output characteristic according to which, as the output voltage of the unit rises from zero, its output current initially falls towards said required level from a predetermined higher level, reaching the required level at approximately half the total required working voltage, and thereafter remains substantially constant at the required level up to an output voltage of the unit at least equal to the total working voltage, each power unit including voltage responsive control means for controlling its output current in accordance with said characteristic, and current responsive regulating means set to determine said higher level at zero output voltage.

2. A regulated power supply arrangement which includes, for opposite ends of a telecommunications cable link having electrical apparatus located between its ends, respective power supply units cooperable to normally provide a joint supply of power to said apparatus at a required current level and each comprising a regulating device, an auxiliary control circuit which is connected to receive an input substantially proportional to the voltage applied to the cable link at the relevant end and which has an input/output characteristic according to which, as said voltage rises, the output of said circuit rises to a predetermined value at approximately half the total working voltage for the cable link power supply and thereafter remains relatively constant, a reference circuit responsive to deviation of cable current from a first predetermined level to provide an output varying in accordance with such deviation, and means for controlling said regulating device, in response to the output of the reference circuit opposed by the output of the auxiliary control circuit, the current fed into the cable link is regulated to fall from said first predetermined level to a second level as said voltage rises to approximately half the total working voltage and to remain substantially constant at said second level for higher voltages, this said second level being substantially the same for both of said power units and corresponding to said required current level.

3. An arrangement as claimed in claim 2, including a saturable choke as the regulating device and also including a magnetic amplifier which is jointly responsive to the outputs of the auxiliary control circuit and the reference circuit in opposition, said choke having a control winding fed from said magnetic amplifier.

4. An arrangement as claimed in claim 2, wherein the auxiliary control circuit of each supply unit comprises input terminals connected to receive a D.C. voltage substantially proportional to the voltage applied to the cable by the unit, a Zener diode and a resistance connected in series across said input terminals, the diode being poled towards the positive terminal, and a transistor having its collector-emitter diode connected in a circuit across the input terminals and its base-emitter diode connected in a circuit across the Zener diode, the connections being such that rising voltage at the input terminals produces rising collector-emitter current in the transistor until the voltage reaches a value at which the reverse impedance of the Zener diode collapses, whereafter the collector-emitter current of the transistor remains substantially constant for further rise of voltage at the input terminals.

References Cited in the file of this patent
UNITED STATES PATENTS 2,153,329    Jutson _____ Apr. 4, 1939